May 8, 1951　　　　F. H. ERDMAN　　　　2,552,004
WASHER-CAPSCREW COMBINATION
Filed May 29, 1946
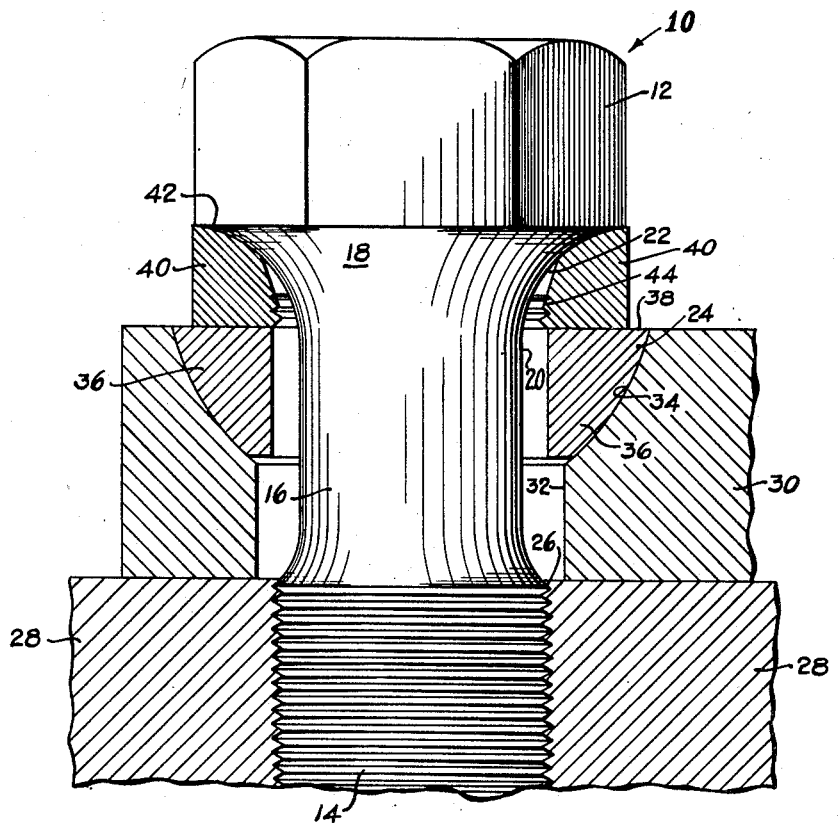
INVENTOR.
FRANCIS H. ERDMAN.
BY
ATTORNEY Patented May 8, 1951

2,552,004

UNITED STATES PATENT OFFICE 2,552,004

WASHER-CAPSCREW COMBINATION

Francis H. Erdman, Germantown, Pa., assignor to Wright Aeronautical Corporation, a corporation of New York Application May 29, 1946, Serial No. 673,105

1 Claim. (Cl. 189—36)

This invention relates to cap screws, machine screws, bolts and similar machine elements and is particularly directed to the combination of such machine elements with a washer construction for minimizing stress concentrations in said elements. As herein used, the term "cap screw" is intended to include other headed machine elements such as machine screws, bolts and the like.

In the past, the head of a cap screw has been formed with a flat surface on its under side for engaging a cooperating member to be secured or clamped thereby. Also, in order to eliminate bending stresses in the shank of the cap screw, it is known to provide a spherical seat on said cooperating member about the hole through which the cap screw extends with a washer having a flat surface engaging the flat under surface of the cap screw head and having a spherical surface mating with said spherical seat. This conventional construction, although eliminating bending stresses in the cap screw shank, leaves a region of high stress at the relatively sharp junction between the cap screw stem and the flat under side of the cap screw head.

It is an object of this invention to provide a cap screw and washer construction eliminating the aforementioned large concentration of stress at the junction of the cap screw stem and head in a conventional cap screw. Specifically, the invention comprises a cap screw in which the under surface of the cap screw head is joined to the cap screw shank by an arcuate concave surface of revolution tangent to the shank and extending from the shank to the outer edge of the cap screw head. In addition, a pair of washers are stacked under the cap screw head, the one washer having a convex surface engaging the concave under surface of the cap screw head and the other washer having a spherical surface engaging a spherical seat formed on the adjacent side of a member to be secured or clamped by said cap screw.

Other objects of this invention will become apparent upon reading the annexed detailed description in connection with the drawing which comprises a sectional view disclosing a cap screw and washer construction embodying the invention.

Referring to the drawing, a cap screw 10 comprises a head 12, a threaded stem 14, and a reduced diameter neck or shank portion 16 joining said head and stem. The side or end of the cap screw head adjacent the cap screw stem is hereinafter termed its "under side." The surface 18 of the under side of the cap screw head comprises a concave surface of revolution which is tangent to the reduced diameter neck or shank portion 16 of the cap screw stem at 20 and extends radially outwardly to the outer edge of the cap screw head 12. Preferably and as illustrated, the generating element 22 of the surface 18 comprises a circular arc with its center at 24 disposed radially outwardly beyond the outer edge of the cap screw head 12. With this construction, every portion of the surface 18 slopes inwardly toward the threaded stem 14. Obviously, however, the generating element may have a curvature other than circular, or it may comprise a series of tangent circular arcs and still have every portion sloping inwardly toward the threaded stem 14.

The threaded end of the cap screw is adapted to be threaded into a tapped hole 26 in a first member 28 for securing a second member 30 thereto. The second member 30 is provided with a hole 32 through which the cap screw extends in clearance relation. Preferably, the end of the hole 32 through which the cap screw is received, is provided with a concentric outwardly facing spherical seat 34 against which a washer 36 having the same spherical curvature is seated. The washer 36 has a flat outer surface 38 against which the flat surface of a second washer 40 is disposed. The second washer 40 has a convex surface 42 of revolution on its other side having substantially the same curvature as the surface 18 on the under side of the cap screw head 12. The concave under side of the cap screw head is adapted to bear against the convex surface of the washer 42 as illustrated.

With the above construction, the spherical washer 36 insures alinement of the cap screw with the axis of the tapped hole 26 without imposing any bending stresses on the cap screw. Also, the concave surface of revolution 18 provides a curved surface, having a relatively large radius of curvature, between the cap screw stem 16 and its head 12 thereby reducing the stress concentration usually present in this region of a cap screw. The flat engaging surfaces of the washers 36 and 40 permits lateral displacement of the cap screw relative to the axis of the hole 32 if the holes 32 and 26 happen to be out of alinement—for example, because of manufacturing errors.

In the conventional prior art construction, the under side of the cap screw head is flat and a fillet is provided between this flat surface and the cap screw stem. It is also conventional practice to provide a spherical washer with a flat side engaging the flat under side of the cap screw head. This construction has been used to secure the cylinders of radial cylinder aircraft engines to the engine crankcase. In these cylinder hold down cap screws, failure of the cap screws has been experienced because of the high stress in the cap screw at the fillet adjoining the cap screw stem with the under side of the cap screw head. It might seem that merely increasing the radius of this fillet would relieve the stress concentration at this point. However, in the conventional cap screw, increasing the radius of the fillet also increases the bending moment arm from the cap screw stem to the point of application of the load to the cap screw head. Accordingly, little or no reduction in the magnitude of the stress at the fillet is effected by increasing the radius of the fillet in the conventional cap screw. With the construction of the present invention, the moment arm from the cap screw stem to the point of application of the load to the under side of the cap screw head remains small and at the same time, a large smooth curve is provided from the outer edge of the cap screw head to the cap screw stem. This combination has been found to effect a material reduction in the maximum stress in the region between the cap screw head and stem.

The construction of the present invention also provides for increased flexibility of the cap screw as compared to the prior art. This increased flexibility of the cap screw results from the increase in length of the neck of the cap screw because of the added washer 40 and the added washer 40 itself introduces added flexibility into the construction. Also, in the conventional cap screw, because of the flat under side of its head, the cap screw head may be disposed laterally relative to the surface contact by its under side so that it may have a large contact area on one side and a small contact area on the other side. However, with the present invention, the contact area between the cap screw head and washer 40 is always uniform around the head. This is so because the curved nature of the mating surface between the under side of the cap screw head and the washer 40 keeps these surfaces concentric. Accordingly, higher bearing pressures are permissible on the under side of the cap screw head of the present invention.

The washer 40 may be provided with at least partial internal threads 44 as illustrated so that in assembly, the washer must be threaded along the cap screw stem threads to the reduced neck of the cap screw. In this way, the threads 44 on the washer 40 will prevent accidental separation of the cap screw and washer once they are assembled. The washer 36 may be provided with internal threads for a similar purpose. However, it is essential that sufficient clearance be provided between the washer 36 and the neck 16 of the cap screw to prevent interference therebetween as a result of manufacturing errors.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

In combination, first and second members to be secured together, a cap screw securing said members together, the underside of the head of said cap screw comprising a concave surface of revolution extending inwardly from substantially the outer edge of the cap screw head and terminating substantially tangent to the shank of said cap screw, the adjacent one of said members having a concave spherical seat facing the cap screw head and through which the stem of said cap screw extends, and a pair of stacked co-axial washers disposed about the cap screw stem between said concave surface and spherical seat, one of said washers having a convex surface on one side engaging said concave surface, the engaging portions of said surfaces having a similar curvature, the other of said washers having a spherical surface on one side fitted to said spherical seat, said washers having flat engaging sides disposed at right angles to their axis.

FRANCIS H. ERDMAN.

REFERENCES CITED

The following references are of record in the file of this patent:

UNITED STATES PATENTS

| Number | Name | Date |
| --- | --- | --- |
| 1,137,600 | Gallagher | Apr. 27, 1915 |
| 1,412,502 | Andrioli | Apr. 11, 1922 |
| 1,691,828 | Shupert | Nov. 13, 1928 |
| 1,926,925 | Wescott | Sept. 12, 1933 |

FOREIGN PATENTS

| Number | Country | Date |
| --- | --- | --- |
| 12,207 | Great Britain | June 13, 1905 |
| 418,914 | Great Britain | Nov. 2, 1934 |